United States Patent
Sung et al.

(10) Patent No.: US 12,027,075 B2
(45) Date of Patent: Jul. 2, 2024

(54) ELECTRONIC SHELF LABEL

(71) Applicant: RAINUS CO., LTD., Seongnam-si (KR)

(72) Inventors: Jong Woo Sung, Seongnam-si (KR); Hyun-Hak Kim, Seongnam-si (KR)

(73) Assignee: RAINUS CO., LTD., Seongnam-si (KR)

( * ) Notice: Subject to any disclaimer, the term of this patent is extended or adjusted under 35 U.S.C. 154(b) by 164 days.

(21) Appl. No.: 17/796,355

(22) PCT Filed: Sep. 25, 2020

(86) PCT No.: PCT/KR2020/013048
§ 371 (c)(1),
(2) Date: Jul. 29, 2022

(87) PCT Pub. No.: WO2021/256616
PCT Pub. Date: Dec. 23, 2021

(65) Prior Publication Data
US 2023/0106402 A1  Apr. 6, 2023

(30) Foreign Application Priority Data

Jun. 15, 2020  (KR) .................. 10-2020-0072163

(51) Int. Cl.
*G09F 3/20* (2006.01)
*G06F 3/04886* (2022.01)
(Continued)

(52) U.S. Cl.
CPC .......... *G09F 3/208* (2013.01); *G06F 3/04886* (2013.01)

(58) Field of Classification Search
CPC ...... G06F 3/147; G06F 3/0482; G06F 1/1601; G06F 3/04886; G09F 3/208
See application file for complete search history.

(56) References Cited

U.S. PATENT DOCUMENTS 5,966,696 A * 10/1999 Giraud .................. G06Q 30/02
  235/383
6,232,932 B1 * 5/2001 Thorner ................ G06F 1/1601
  348/121

(Continued)

FOREIGN PATENT DOCUMENTS

JP       2011-96039 A        5/2011
KR   10-2016-0106970 A       9/2016

(Continued)

OTHER PUBLICATIONS

International Search Report mailed on Mar. 5, 2021, in connection with International Patent Application No. PCT/KR2020/013048, along with an English translation.

(Continued)

*Primary Examiner* — Shin H Kim
(74) *Attorney, Agent, or Firm* — Hauptman Ham, LLP (57) ABSTRACT

According to an embodiment of the present disclosure, an electronic shelf label includes a display configured to receive a touch input from a user and display information to a user on a screen; and a controller configured to control the screen displayed by the display based on the input received through the display, the display is configured to receive a division input, a virtual cell selection input, or a virtual cell adjustment input from the user and the controller is configured to: generate a plurality of virtual cells by dividing the screen based on the division input, assign a unique code to each of the plurality of virtual cells, and adjust the plurality of virtual cells or the unique code based on the virtual cell selection input or the virtual cell adjustment input.

12 Claims, 10 Drawing Sheets

(51) Int. Cl.
*G06K 9/00* (2022.01)
*G06N 20/00* (2019.01)

(56) References Cited

U.S. PATENT DOCUMENTS

| | | | | |
|---|---|---|---|---|
| 9,019,171 | B2* | 4/2015 | Wang | G06F 3/1431 |
| | | | | 345/1.3 |
| 9,521,472 | B2* | 12/2016 | Lee | G06F 3/147 |
| 11,861,144 | B2* | 1/2024 | Sung | G06F 3/147 |
| 2010/0177018 | A1* | 7/2010 | Wang | G09F 9/35 |
| | | | | 345/1.3 |
| 2014/0062649 | A1* | 3/2014 | Lee | G06K 19/0727 |
| | | | | 340/5.1 |
| 2015/0095189 | A1* | 4/2015 | Dharssi | G06V 10/56 |
| | | | | 705/26.8 |
| 2016/0019514 | A1* | 1/2016 | Landers, Jr. | G06Q 20/202 |
| | | | | 705/23 |
| 2016/0189277 | A1* | 6/2016 | Davis | H04N 7/181 |
| | | | | 705/26.8 |
| 2017/0193593 | A1* | 7/2017 | Na | G06Q 30/0639 |
| 2019/0282000 | A1* | 9/2019 | Swafford | A47F 10/02 |
| 2020/0146504 | A1* | 5/2020 | Patterson | A47J 36/321 |
| 2020/0286135 | A1* | 9/2020 | Matayoshi | G09F 3/204 |
| 2022/0398529 | A1* | 12/2022 | Sung | G06F 3/04886 |
| 2023/0022179 | A1* | 1/2023 | Sung | G06Q 10/08 |
| 2023/0106402 | A1* | 4/2023 | Sung | G06F 3/14 |
| | | | | 40/5 |
| 2024/0029596 | A1* | 1/2024 | Sung | G09F 3/208 |

FOREIGN PATENT DOCUMENTS

| | | |
|---|---|---|
| KR | 10-2017-0081916 A | 7/2017 |
| KR | 10-1768933 B1 | 8/2017 |

OTHER PUBLICATIONS

Written Opinion mailed on Mar. 5, 2021, in connection with International Patent Application No. PCT/KR2020/013048.

* cited by examiner

ELECTRONIC SHELF LABEL

CROSS-REFERENCE TO RELATED APPLICATIONS

The present application is a national stage filing under 35 U.S.C § 371 of PCT application number PCT/KR2020/013048 filed on Sep. 25, 2020, which is based upon and claims the benefit of priorities to Korean Patent Application No. 10-2020-0072163 filed on Jun. 15, 2020, in the Korean Intellectual Property Office, which are incorporated herein in their entireties by reference.

TECHNICAL FIELD

The present disclosure relates to an electronic shelf label, and more particularly, to an electronic shelf label that may adjust a virtual cell and a unique code displayed on the electronic shelf label using various methods.

BACKGROUND ART

A large number of products on sale are displayed on a display stand in stores such as large marts. A label of recording product information such as product name, product price, and product shelf-life is attached to the display stand, and customers may identify the product information by checking the label.

The displayed products are sold within a short time period in stores where products are quickly distributed, so the product information displayed on the label may be frequently changed. Therefore, an electronic shelf label (ESL) is widely used in stores to easily change the product information displayed on the label and to repeatedly use.

The ESL receives and displays various pieces of product information including price information. The ESL is a substitute for other paper labels and may display product information.

Figure 1:
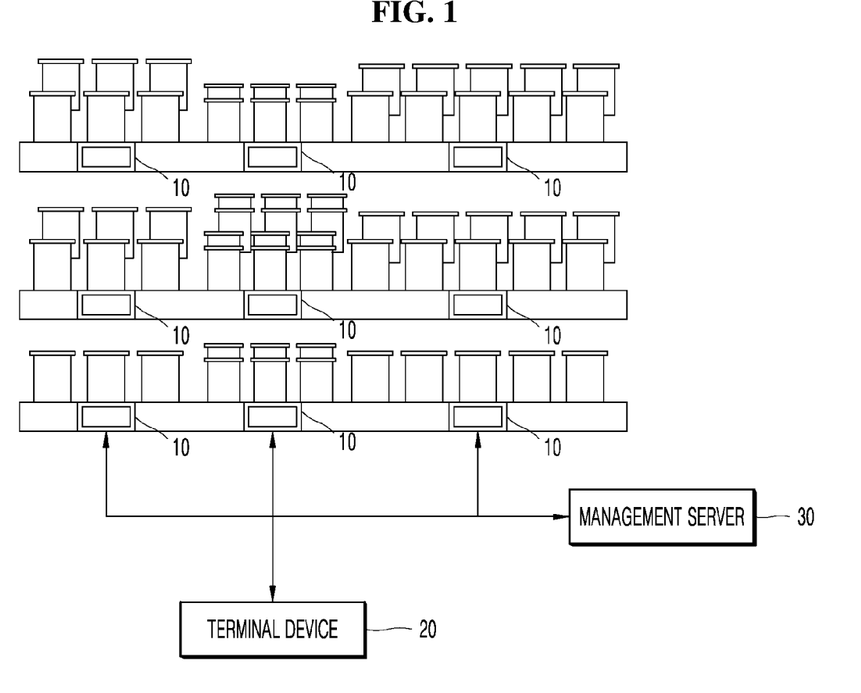
FIG. 1 shows a conventional electronic shelf label used to display information on products displayed on a display stand of a store.

FIG. 1 shows a conventional ESL used to display product information on product displayed on a display stand of a store.

Referring to FIG. 1, it may be seen that a plurality of ESLs 10 are used to display product information on a plurality of products displayed on the display stand. To display the product information on the ESL 10 as described above, a store manager may place the ESL 10 according to the position of the product displayed on the display stand and map the individual ESL 10 to the displayed product using a terminal device 20 such as a PDA. Specifically, a process of storing mapping information in a management server 30 by reading the unique number of the ESL 10 and an identification code of the product to be mapped by the terminal device 20 using means such as a barcode or NFC is performed. Subsequently, the ESL 10 receives the information on the mapped product from the management server 30 and displays the product information.

The manager has to map the individual ESL 10 to the product while carrying the terminal device 20 to display product information using the ESL 10 as described above. If an abnormality occurs in the terminal device 20, there is a problem in that the product information to be displayed on the ESL 10 may not be set.

In addition, the manager has to arrange a different number of ESLs 10 according to the number of types of products displayed on a display stand. That is, as the number of types of products displayed on the display stand is changed, the manager experiences inconvenience of having to change the number of ESLs 10 arranged on the display stand.

DISCLOSURE

Technical Problem

The present disclosure provides an electronic shelf label that may adjust a virtual cell and a unique code by a manager using various methods to display product information on a plurality of products by an electronic shelf label.

The present disclosure also provides an electronic shelf label that may adjust the virtual cell by a simple operation as desired by the manager.

The objects of the present disclosure are not limited to the above-mentioned objects, and other objects and advantages of the present disclosure that are not mentioned may be understood by the following description, and will be more clearly understood by embodiments of the present disclosure. In addition, it will be easily understood that the objects and advantages of the present disclosure may be realized by features described in claims and a combination thereof.

Technical Solution

According to an embodiment of the present disclosure, an electronic shelf label includes a display configured to receive a touch input from a user and display information to a user on a screen; and a controller configured to control the screen displayed by the display based on the input received through the display, the display is configured to receive a division input, a virtual cell selection input, or a virtual cell adjustment input from the user and the controller is configured to: generate a plurality of virtual cells by dividing the screen based on the division input, assign a unique code to each of the plurality of virtual cells, and adjust the plurality of virtual cells or the unique code based on the virtual cell selection input or the virtual cell adjustment input.

In addition, according to an embodiment of the present disclosure, for the electronic shelf label, the virtual cell selection input is an input of touching any one of the plurality of virtual cells.

In addition, according to an embodiment of the present disclosure, for the electronic shelf label, the controller is configured to: based on determination that the virtual cell adjustment input is a touch input connecting a virtual cell 1, which is any one of the plurality of virtual cells to a virtual cell 2, which is any one of virtual cells neighboring to the virtual cell 1, merge the virtual cell 1 and the virtual cell 2.

In addition, according to an embodiment of the present disclosure, for the electronic shelf label, the controller is configured to set a unique code of a virtual cell generated by merging the virtual cell 1 and the virtual cell 2 to be any one of a unique code of the virtual cell 1 and a unique code of the virtual cell 2.

In addition, according to an embodiment of the present disclosure, the controller is configured to: based on determination that the virtual cell adjustment input is a touch input connecting a virtual cell 1, which is any one of the plurality of virtual cells to any one of boundary lines between the plurality of virtual cells, move the virtual cell 1 to a position corresponding to a boundary line at which the touch input ends.

In addition, according to an embodiment of the present disclosure, for the electronic shelf label, the controller is configured to: based on determination that the virtual cell adjustment input is a touch input connecting any area of a first side of a virtual cell 1, which is any one of the plurality of virtual cells, to any area of a second side of the virtual cell 1, divide the virtual cell 1 with respect to a boundary at an area where the virtual cell adjustment input is received.

In addition, according to an embodiment of the present disclosure, for the electronic shelf label, the controller is configured to: set the unique code of any one of the virtual cells generated by dividing the virtual cell 1 to be identical to a unique code of the virtual cell 1 and set a unique code of the other virtual cell to not be identical to each of the unique codes of other virtual cells.

In addition, according to an embodiment of the present disclosure, for the electronic shelf label, the controller is configured to: based on determination that the virtual cell adjustment input is a touch input connecting a boundary line between a virtual cell 1, which is any one of the plurality of virtual cells and a virtual cell 2, which is any one of virtual cells neighboring to the virtual cell 1 to any area of the virtual cell 1 or the virtual cell 2, move the boundary line to an area where the virtual cell adjustment input is received.

In addition, according to an embodiment of the present disclosure, for the electronic shelf label, the controller is configured to: based on determination that the virtual cell adjustment input is a touch input connecting any area of a virtual cell 1, which is any one of the plurality of virtual cells to any area of a first side of the virtual cell 1, merge the virtual cell 1 and a virtual cell 2, which is any one of virtual cells neighboring to the virtual cell 1.

In addition, according to an embodiment of the present disclosure, for the electronic shelf label, the controller is configured to set a unique code of the virtual cell generated by merging the virtual cell 1 and the virtual cell 2 to be a unique code of the virtual cell 2.

In addition, according to an embodiment of the present disclosure, for the electronic shelf label, the controller is configured to: based on reception of a lock input from the user, control the display in a lock mode in which the plurality of virtual cells and the unique code are not adjusted even when the virtual cell selection input or the virtual cell adjustment input is received.

In addition, according to an embodiment of the present disclosure, for the electronic shelf label, the controller is configured to: based on reception of an unlock input from the user when the controller controls the display in the lock mode, control the display in a normal mode in which the plurality of virtual cells or the unique code are adjusted based on the virtual cell selection input or the virtual cell adjustment input.

Advantageous Effects

A manager may adjust a virtual cell and a unique code by various methods using an electronic shelf label according to the present disclosure.

In addition, the manager may adjust the virtual cell by a simple operation as desired using the electronic shelf label according to the present disclosure.

In addition to the above-described effects, further effects of the present disclosure are described together with explanations of specific matters to implement the present disclosure.

BEST MODE

The above-mentioned objects, features, and advantages of the present disclosure are described in detail with reference to accompanying drawings. Therefore, the skilled person in the art to which the present disclosure pertains may easily embody the technical idea of the present disclosure. In the description of the present disclosure, a detailed description of a well-known technology relating to the present disclosure may be omitted if it unnecessarily obscures the gist of the present disclosure. Hereinafter, preferred embodiments of the present disclosure are described in detail with reference to the accompanying drawings. In the drawings, same reference numerals are used to refer to same or similar components.

Terms such as first, second, and the like may be used herein to describe various elements of the present disclosure. These elements are not limited by these terms. These terms are intended to distinguish one element from another element. A first element may be a second element unless otherwise stated.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

Singular expressions used in the present disclosure include plural expressions unless the context clearly displays otherwise. In the present disclosure, terms such as "including" or "comprising" should not be construed as necessarily including all of the various components, or various steps described in the present disclosure, and terms such as "including" or "comprising" should be construed as not including some elements or some steps or further including additional elements or steps.

Unless otherwise stated, each component may be singular or plural throughout the disclosure.

Hereinafter, an electronic shelf label according to some embodiments of the present disclosure is described.

Hereinafter, a user refers to any person using the electronic shelf label. In addition, a manager refers to a person using the electronic shelf label to manage products sold in the store among users and a consumer refers to a person using the electronic shelf label to obtain product information or purchase products in a store among users.

Figure 2:
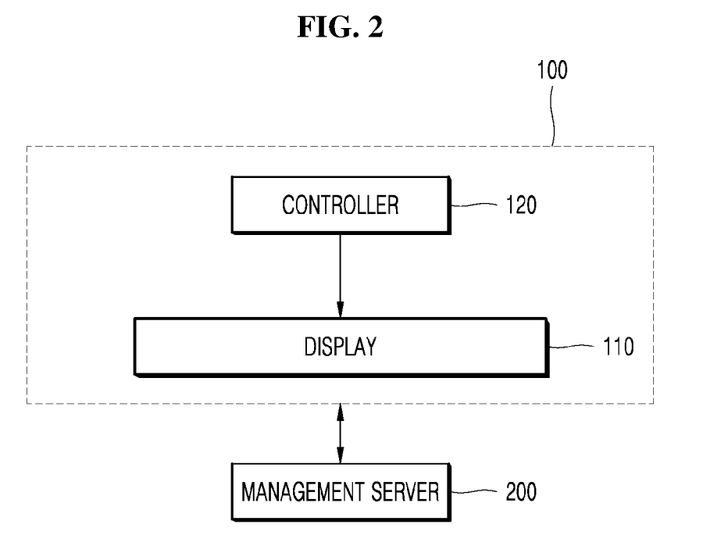
FIG. 2 shows an electronic shelf label according to an embodiment of the present disclosure.

FIG. 2 shows an electronic shelf label according to an embodiment of the present disclosure.

Referring to FIG. 2, an electronic shelf label 100 according to an embodiment of the present disclosure includes a display 110 and a controller 120.

According to an embodiment of the present disclosure, the electronic shelf label 100 may have a bar shape and a horizontal length thereof is longer than a vertical length thereof when the electronic shelf label 100 is coupled to a display stand. With the bar shape of the electronic shelf label 100, an electronic shelf label 100 may display product information on a plurality of products.

The display 110 receives a touch input from a user and displays information to the user on a screen. That is, the display 110 receives the touch input from the user, transmits the touch input to the controller 120, and displays the information to the user according to a command received from the controller 120. The display 110 may display information to the user on one or more virtual cells.

In an embodiment of the present disclosure, the display 110 may be a touch screen capable of displaying information to the user on the screen while receiving the touch input from the user.

The controller 120 controls the screen displayed by the display 110 based on the input received through the display 110. The controller 120 may include a memory to store instructions for controlling the screen displayed by the display 110 based on the input received through the display 110, a processor to process the instructions stored in the memory, and a communication module to communicate with a management server 200 described below.

The controller 120 may control the display 110 to be operated in a consumer mode or a manager mode.

The consumer mode is a mode in which product information is displayed to the consumer. When the electronic shelf label 100 is operated in the consumer mode, the controller 120 may control the display 110 to display a different screen according to the input received through the display 110. In addition, when the electronic shelf label 100 is operated in the consumer mode, the controller 120 may transmit data to the management server 200 described below based on the input received through the display 110.

The manager mode is a mode in which the user may set the screen displayed in the consumer mode. When the electronic shelf label is operated in the manager mode, the user applies the input to the display 110 to divide the screen displayed on the display 110 into virtual cells and match the divided virtual cell to the product.

The electronic shelf label according to an embodiment of the present disclosure described below relates to an electronic shelf label that may divide and adjust a virtual cell in the manager mode by the manager using various methods to display information on a plurality of products using an electronic shelf label.

A more detailed operation of the electronic shelf label 100 as described above may be described with reference to FIGS. 3 to 10.

Figure 3:
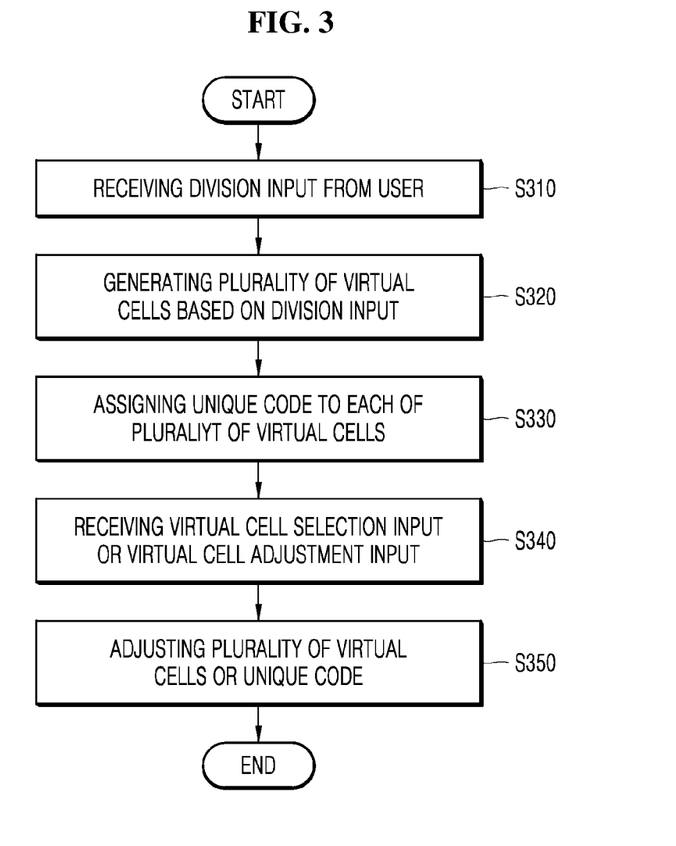
FIG. 3 is a flowchart of a method for controlling an electronic shelf label according to an embodiment of the present disclosure.

FIG. 3 is a flowchart of a method for controlling an electronic shelf label according to an embodiment of the present disclosure.

Referring to FIG. 3, a display 110 receives a division input from a user (S310). The division input is an input including information on how the user divides a screen of the display 110 and may include information on the number or a size of virtual cells to be generated by division. The division input may be two or more consecutive touch inputs to the display 110, a number input using a virtual keypad, and a template selection input.

Subsequently, the controller 120 generates a plurality of virtual cells by dividing a screen of the display 110 based on the division input (S320) and assigns a unique code to each of the plurality of virtual cells (S330). This configuration may be described in more detail with reference to FIG. 4.

Figure 4:
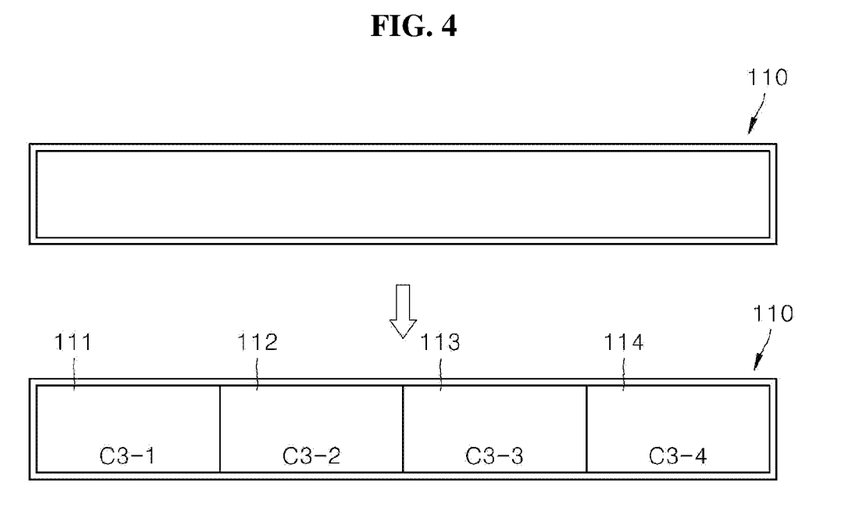
FIG. 4 shows a method for generating a plurality of virtual cells and assigning a unique code when an electronic shelf label according to an embodiment of the present disclosure receives a division input.

FIG. 4 shows a method for generating a plurality of virtual cells and assigning a unique code based on an electronic shelf label according to an embodiment of the present disclosure receiving a division input.

Referring to FIG. 4, a display 110 before receiving the division input is shown at an upper portion thereof and a display 110 displaying virtual cells generated based on the division input is shown at a lower portion thereof.

The user may apply the division input to the display 110. If the division input is two or more consecutive touch inputs, the controller 120 may generate virtual cells having the number corresponding to the number of consecutive touch inputs. If the division input is a number input using the virtual keypad, the controller 120 may generate virtual cells having the number corresponding to that of the number inputs. If the division input is the template selection input, the controller 120 may generate virtual cells based on the template selection input.

If the division input includes an input of generating four virtual cells, the controller 120 may generate a plurality of virtual cells 111, 112, 113, and 114 by dividing a screen of the display 110 into four virtual cells as shown at the lower portion of FIG. 4.

After generating the plurality of virtual cells 111, 112, 113, and 114, the controller 120 assigns a unique code to each of the plurality of virtual cells 111, 112, 113, and 114 (S330).

The unique code distinguishes the generated virtual cell from other virtual cells and may include letters or numbers.

In an embodiment of the present disclosure, the unique code may be arbitrarily set in order not to be identical to the unique code assigned to each of other virtual cells.

In addition, in another embodiment of the present disclosure, the unique code may be generated in consideration of a zone of the display stand on which the electronic shelf label is disposed in the store, the position of the electronic shelf label on the display stand, a sequence of virtual cells, and the like. For example, if the display stand on which the electronic shelf label 100 is disposed is located in zone C of the store, the electronic shelf label 100 is located on a 3rd floor from the top on the display stand, and the virtual cell is disposed at a leftmost side of the electronic shelf label 100, the unique code may be set as C3-1.

The manager may easily manage the plurality of virtual cells 111, 112, 113, and 114 using the unique code assigned to each of the plurality of virtual cells 111, 112, 113, and 114 as described above.

In this case, the display 110 may display the unique code assigned to each of the plurality of virtual cells 111, 112, 113, and 114 as shown at the lower portion of FIG. 4.

Referring back to FIG. 3, after assigning the unique code to each of the plurality of virtual cells 111, 112, 113, and 114, the display 110 may receive a virtual cell selection input or a virtual cell adjustment input from the user (S340).

The virtual cell selection input is an input of selecting any one of the plurality of virtual cells 111, 112, 113, and 114 displayed on the display 110 and may be set as an input of touching any one of the plurality of virtual cells 111, 112, 113, and 114.

Although not shown in the drawing, the controller 120 may control brightness of the selected virtual cell to be brighter than that of an unselected virtual cell based on receiving the virtual cell selection input. The user may distinguish the selected virtual cell from other virtual cells based on the brightness thereof.

The virtual cell adjustment input is an input of merging, dividing, resizing, or deleting virtual cells. In an embodiment of the present disclosure, the virtual cell adjustment input includes a touch input connecting a virtual cell 1, which is any one of the plurality of virtual cells, to a virtual cell 2, which is any one of virtual cells neighboring to the virtual cell 1, a touch input connecting any area of a first side of the virtual cell 1 to any area of a second side of the virtual cell 1, a touch input connecting a boundary line between the virtual cell 1 and the virtual cell 2 to any area of the virtual cell 1 or the virtual cell 2, or a touch input connecting any area of the virtual cell 1, which is any one of the plurality of virtual cells, to a first side of the virtual cell 1.

The controller 120 adjusts a virtual cell based on the type of the received virtual cell selection input or virtual cell adjustment input and adjusts a unique code assigned to each of the plurality of virtual cells 111, 112, 113 and 114 (S350).

A more detailed method for adjusting the virtual cell based on the type of the virtual cell selection input or the virtual cell adjustment input and adjusting the unique code assigned to each of the plurality of virtual cells 111, 112, 113, and 114 may be described in more detail with respect to FIGS. 5 to 9.

Figure 5:
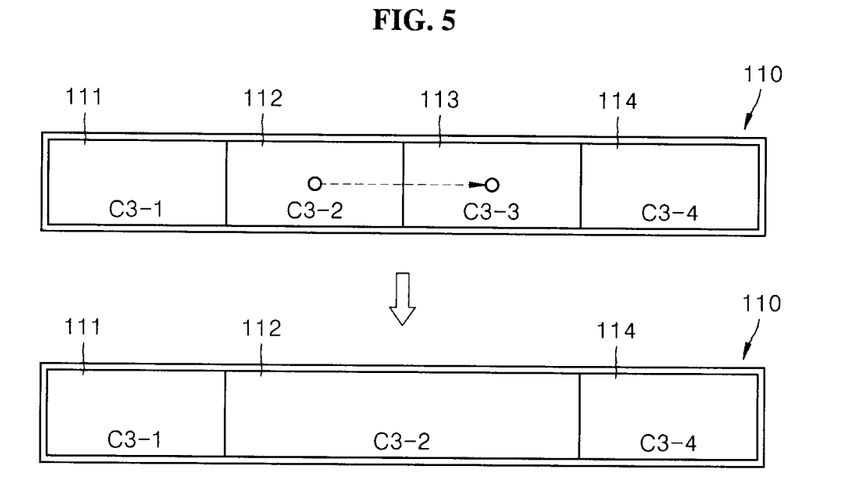
FIG. 5 shows a method for merging virtual cells based on a virtual cell adjustment input by an electronic shelf label according to an embodiment of the present disclosure.

FIG. 5 shows a method for merging virtual cells based on a virtual cell adjustment input by an electronic shelf label according to an embodiment of the present disclosure.

Referring to FIG. 5, a display 110 before receiving the virtual cell adjustment input is shown at an upper portion thereof and a display 110 displaying virtual cell merged based on the virtual cell adjustment input is shown at a lower portion thereof.

The user may apply a touch input connecting a virtual cell 1, which is any one of plurality of virtual cells 111, 112, 113, and 114 to a virtual cell 2, which is any one of virtual cells neighboring to the virtual cell 1 as a virtual cell adjustment input. Based on determination that the virtual cell adjustment input is the touch input connecting the virtual cell 1 to the virtual cell 2, the controller 120 merges the virtual cell 1 and the virtual cell 2. Subsequently, the controller 120 sets a unique code of the virtual cell generated by merging the virtual cell 1 and the virtual cell 2 to be any one of a unique code of the virtual cell 1 and a unique code of the virtual cell 2.

As shown at the upper portion of FIG. 5, the user may apply a touch input connecting a second virtual cell 112 among the plurality of virtual cells 111, 112, 113, and 114 to a third virtual cell 113 among the plurality of virtual cells 111, 112, 113 and 114 as a virtual cell adjustment input. Then, the controller 120 may merge the second virtual cell 112, which is the virtual cell 1, and the third virtual cell 113, which is virtual cell 2, as shown at the lower portion of FIG. 5. Subsequently, the controller may set a unique code of the virtual cell generated by merging to be the same as the unique code of the second virtual cell 112 before merging.

Figure 6:
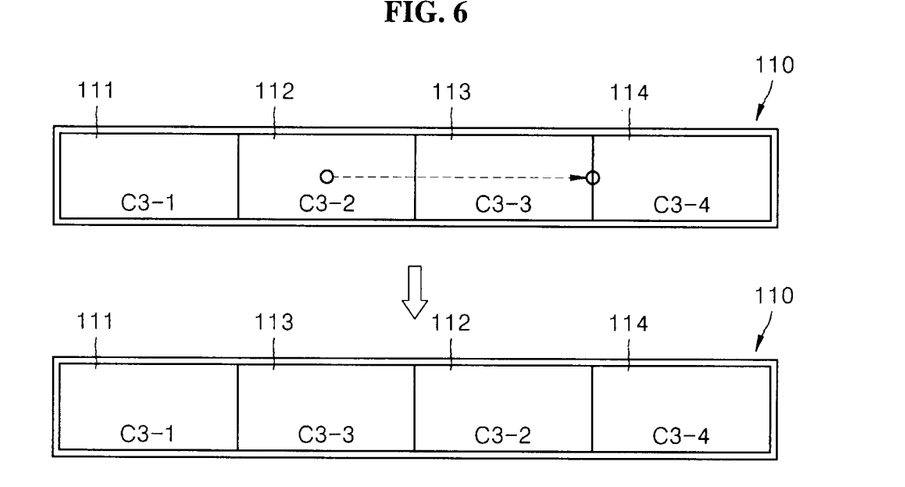
FIG. 6 shows a method for moving virtual cells based on a virtual cell adjustment input by an electronic shelf label according to an embodiment of the present disclosure.

FIG. 6 shows a method for moving virtual cells based on a virtual cell adjustment input by an electronic shelf label according to an embodiment of the present disclosure.

Referring to FIG. 6, a display 110 before receiving the virtual cell adjustment input is shown at an upper portion thereof and a display 110 displaying a virtual cell merged based on the virtual cell adjustment input is shown at a lower portion thereof.

As a virtual cell adjustment input, the user may apply a touch input of connecting a virtual cell 1, which is any one of a plurality of virtual cells 111, 112, 113 and 114 to any one of boundary lines between the plurality of virtual cells 111, 112, 113 and 114. Based on determination that the virtual cell adjustment input is the touch input connecting the virtual cell 1 to any one of the boundary lines between the plurality of virtual cells 111, 112, 113, and 114, the controller 120 moves the virtual cell 1 to a position corresponding to any one of the boundary lines between the plurality of virtual cells 111, 112, 113 and 114.

As shown at the upper portion of FIG. 6, the user may apply a touch input connecting a second virtual cell 112 among the plurality of virtual cells 111, 112, 113, and 114 to a boundary line between the third virtual cell 113 and the fourth virtual cell 114 among the plurality of virtual cells 111, 112, 113, and 114 as the virtual cell adjustment input. Based on the touch input, the controller 120 moves the second virtual cell 112, which is a virtual cell 1, to a position corresponding to the boundary line between the third virtual cell 113 and the fourth virtual cell 114 as shown at the lower portion of FIG. 6. That is, the controller 120 moves the virtual cell 112 between the third virtual cell 113 and the fourth virtual cell 114.

Figure 7:
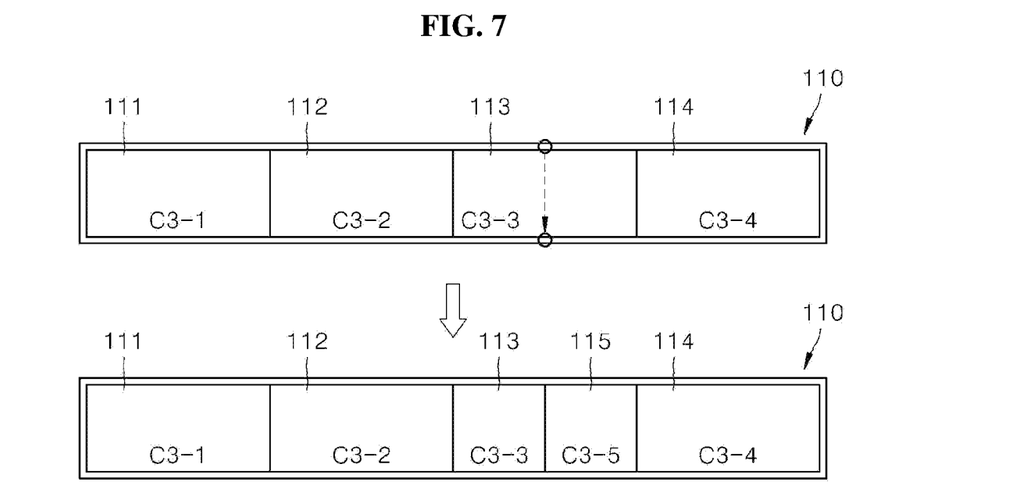
FIG. 7 shows a method for dividing a virtual cell based on a virtual cell adjustment input by an electronic shelf label according to an embodiment of the present disclosure.

FIG. 7 shows a method for dividing a virtual cell based on a virtual cell adjustment input by an electronic shelf label according to an embodiment of the present disclosure.

Referring to FIG. 7, a display 110 before receiving the virtual cell adjustment input is shown at an upper portion thereof and a display 110 displaying virtual cells divided based on the virtual cell adjustment input is shown at a lower portion thereof.

As a virtual cell adjustment input, a user may apply a touch input connecting any area of a first side of a virtual cell 1, which is any one of the plurality of virtual cells 111, 112, 113 and 114, to any area of a second side of the virtual cell 1.

In this case, the first side of the virtual cell 1 may be an upper side of the virtual cell 1 in the drawing and the second side of the virtual cell 1 may be a lower side of the display in the drawing. That is, as a virtual cell adjustment input, the user may apply a touch input connecting any area of the upper side of the virtual cell 1 to any area of the lower side of the virtual cell 1.

By contrast, a first side of the virtual cell 1 may be a lower side of the virtual cell 1 in the drawing and the second side of the virtual cell 1 may be an upper side of the virtual cell 1 in the drawing. That is, as the virtual cell adjustment input, the user may apply a touch input connecting any area of the lower side of the virtual cell 1 to any area of the upper side of the virtual cell 1.

Based on determination that the virtual cell adjustment input is a touch input connecting any area of the first side of the virtual cell 1 to any area of the second side of the virtual cell 1, the controller 120 divides the virtual cell 1 with respect to a boundary at an area where the virtual cell adjustment input is received. Subsequently, the controller 120 sets a unique code of any one of the virtual cells generated by dividing the virtual cell 1 to be the same as a unique code of the virtual cell 1 and sets the unique code of the other virtual cell to not be identical to the unique codes of other virtual cells.

As shown at the upper portion of FIG. 7, the user may apply a touch input connecting any area of an upper side of the third virtual cell 113 among the plurality of virtual cells 111, 112, 113, and 114 to any area of a lower side of the third virtual cell 113 as the virtual cell adjustment input. Based on the touch input, the controller 120 may generate two virtual cells 113 and 115 by dividing the third virtual cell 113, which is a virtual cell 1, as shown at the lower portion of FIG. 7. Subsequently, the controller may set a unique code of the virtual cell 113, which is any one of the virtual cells generated by dividing the third virtual cell 113 to be identical to that of the third virtual cell 113 and may set a unique code of the virtual cell 115, which is the other one of the generated virtual cells, to not be identical to the unique codes of the other virtual cells 111, 112, 113, and 114.

Figure 8:
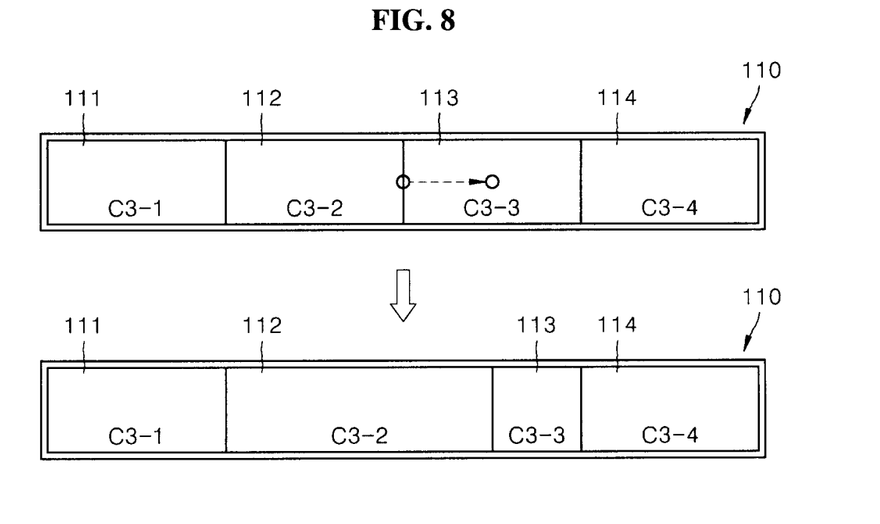
FIG. 8 shows a method for adjusting sizes of virtual cells based on a virtual cell adjustment input according to an embodiment of the present disclosure.

FIG. 8 shows a method for adjusting sizes of virtual cells based on a virtual cell adjustment input by an electronic shelf label according to an embodiment of the present disclosure.

Referring to FIG. 8, a display 110 before receiving the virtual cell adjustment input is shown at an upper portion thereof and a display 110 displaying virtual cells with sizes being adjusted based on the virtual cell adjustment input at a lower portion thereof.

The user may apply a touch input connecting a boundary line between a virtual cell 1, which is any one of a plurality of virtual cells 111, 112, 113, and 114, and a virtual cell 2, which is any one of virtual cells neighboring to the virtual cell 1 to any area of the virtual cell 1 or the virtual cell 2 as a virtual cell adjustment input. Based on determination that the virtual cell adjustment input is a touch input connecting the boundary line between the virtual cell 1 and the virtual cell 2 to any area of the virtual cell 1 or the virtual cell 2, the controller 120 moves the boundary line to an area where the virtual cell adjustment input is received.

As shown at the upper portion of FIG. 8, the user may apply a touch input connecting a boundary line between a second virtual cell 112 among the plurality of virtual cells 111, 112, 113, and 114 and a third virtual cell 113 among the plurality of virtual cells 111, 112, 113, and 114 to any area of the third virtual cell 113 as a virtual cell adjustment input. Based on the touch input, the controller 120 may move the boundary line between the second virtual cell 112, which is a virtual cell 1, and the third virtual cell 113, which is a virtual cell 2 as shown at the lower portion of FIG. 8. Therefore, the sizes of the virtual cells may be adjusted to increase the size of the second virtual cell 112 and reduce the size of the third virtual cell 113.

Figure 9:
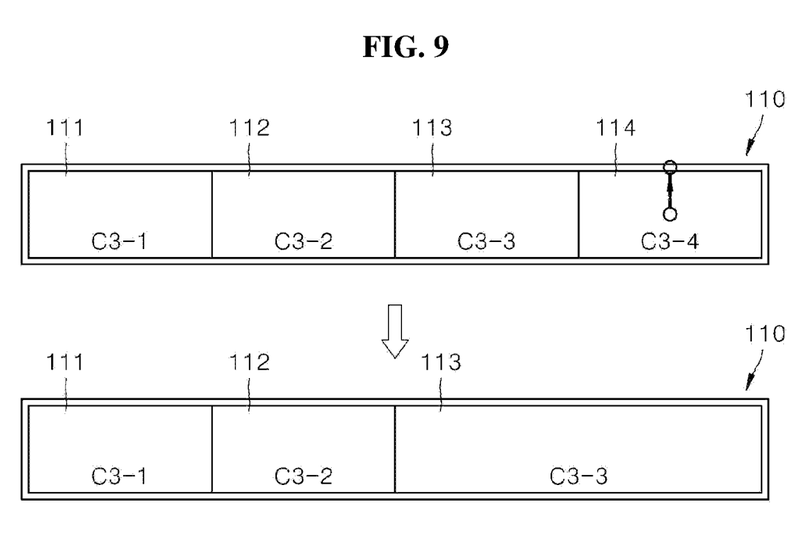
FIG. 9 shows a method for deleting, by an electronic shelf label, a virtual cell based on a virtual cell adjustment input according to an embodiment of the present disclosure.

FIG. 9 shows a method for deleting a virtual cell based on a virtual cell adjustment input by an electronic shelf label according to an embodiment of the present disclosure.

Referring to FIG. 9, a display 110 before receiving the virtual cell adjustment input is shown at an upper portion thereof and a display 110 displaying the virtual cells merged based on a virtual cell adjustment input is shown at a lower portion thereof.

A user may apply a touch input connecting any area of a virtual cell 1, which is any one of a plurality of virtual cells 111, 112, 113, and 114, to a first side of the virtual cell 1 as the virtual cell adjustment input.

In this case, the first side of the virtual cell 1 may be an upper side or a lower side of the virtual cell 1 in the drawing. That is, the user may apply a touch input connecting any area of the virtual cell 1 to the upper side or the lower side of the virtual cell 1 as a virtual cell adjustment input.

Based on determination that the virtual cell adjustment input is a touch input connecting any area of the virtual cell 1 to a first side of the virtual cell 1, the controller 120 may delete the virtual cell 1 by merging the virtual cell 1 and the virtual cell 2. Subsequently, the controller 120 sets a unique code of the virtual cell generated by merging the virtual cell 1 and the virtual cell 2, which is any one of the virtual cells neighboring to the virtual cell 1 as a unique code of the virtual cell 2.

As shown at an upper portion of FIG. 9, the user may apply a touch input connecting any area of the fourth virtual cell 114 among the plurality of virtual cells 111, 112, 113, and 114 to a first side of the fourth virtual cell 114 as the virtual cell adjustment input. Based on the touch input, the controller 120 may delete the fourth virtual cell 114 by merging the fourth virtual cell 114, which is a virtual cell 1, and the third virtual cell 113, which is a virtual cell 2 as shown at the lower portion of FIG. 9. Subsequently, the controller may set a unique code of the virtual cell generated by merging to be identical to a unique code of the third virtual cell 113, which is the virtual cell 2.

Referring back to FIG. 3, the manager may adjust a plurality of virtual cells and the unique code using various methods by an electronic shelf label according to the present disclosure as described above with reference to FIGS. 5 to 9.

When adjusting the virtual cell as described above, the user may prevent the virtual cell from being adjusted by an incorrect input based on a lock input. This configuration may be described in more detail with reference to FIG. 10.

Figure 10:
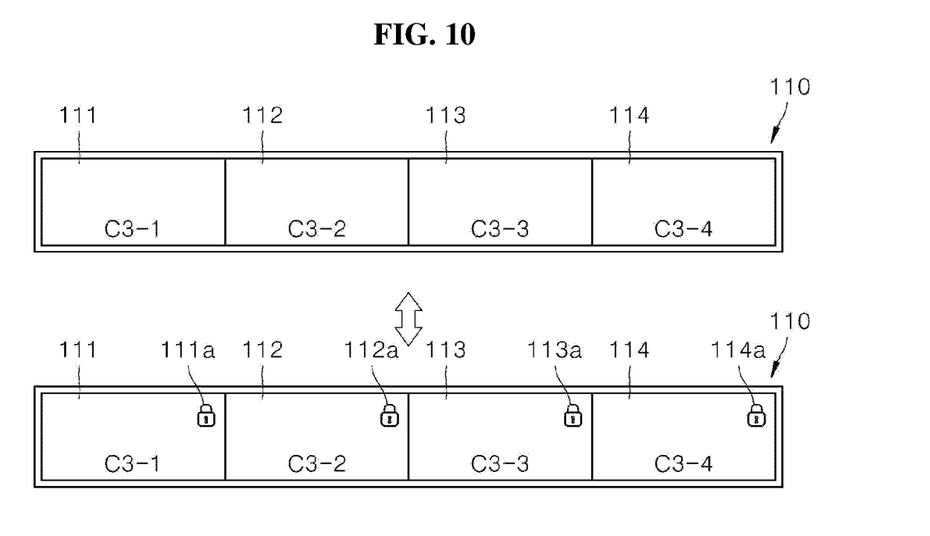
FIG. 10 shows a method for operating an electronic shelf label according to an embodiment of the present disclosure based on a lock input and an unlock input.

FIG. 10 shows a method for operating an electronic shelf label according to an embodiment of the present disclosure based on a lock input and an unlock input.

Referring to FIG. 10, a display 110 before receiving the lock input or when receiving an unlock input in a lock mode is shown at an upper portion thereof and a display 110 after receiving the lock input is shown at a lower portion thereof.

The lock input is an input of controlling a display 110 by a controller 120 in the lock mode in which a plurality of virtual cells 111, 112, 113, and 114 and a unique code are not adjusted even if a virtual cell selection input or a virtual cell adjustment input is received. When the controller 120 controls the display 110 to be in the lock mode, the unlock input is an input of controlling the display 110 by the controller 120 in a normal mode in which a plurality of virtual cells 111, 112, 113, and 114, or a unique code are adjusted based on the virtual cell selection input or the virtual cell adjustment input.

As shown at the upper portion of FIG. 10, when the controller 120 controls the display 110 in the normal mode, the user may apply the lock input. Then, the controller 120 may control the display 110 in the lock mode. In this case, the controller 120 may control the display 110 to indicate a lock state to the user by outputting lock marks 111a, 112a, 113a, and 114a on the display 110 as shown at the lower portion of FIG. 10.

In addition, the user may apply a unlock input in the locked state as shown at the lower portion of FIG. 10. In this case, the controller 120 may prevent the lock marks 111a, 112a, 113a, and 114a from being output on the display 110 and may control the display 110 to be in the normal mode.

As described above, the controller 120 controls the display 110 to be in the lock mode or the normal mode based on the lock input or the unlock input, thereby preventing incorrect input of the user.

The present disclosure has been described as described above with reference to exemplary drawings, but the present disclosure is not limited to the embodiments and drawings disclosed herein, and various modifications may be made by those skilled in the art within the scope of the technical idea of the present disclosure. Further, even if working effects obtained based on configurations of the present disclosure are not explicitly described in the description of embodiments of the present disclosure, effects predictable based on the corresponding configuration have to be recognized.

The invention claimed is:

1. An electronic shelf label, comprising:
    a display configured to receive a touch input from a user and display information to a user on a screen; and
    a controller configured to control the screen displayed by the display based on the input received through the display,
    wherein the display is configured to receive a division input, a virtual cell selection input, or a virtual cell adjustment input from the user and
    wherein the controller is configured to:
    generate a plurality of virtual cells by dividing the screen based on the division input,
    assign a unique code to each of the plurality of virtual cells, and
    adjust the plurality of virtual cells or the unique code based on the virtual cell selection input or the virtual cell adjustment input.

2. The electronic shelf label of claim 1, wherein the virtual cell selection input is an input of touching any one of the plurality of virtual cells.

3. The electronic shelf label of claim 1, wherein the controller is configured to: based on determination that the virtual cell adjustment input is a touch input connecting a virtual cell 1, which is any one of the plurality of virtual cells to a virtual cell 2, which is any one of virtual cells neighboring to the virtual cell 1, merge the virtual cell 1 and the virtual cell 2.

4. The electronic shelf label of claim 3, wherein the controller is configured to set a unique code of a virtual cell generated by merging the virtual cell 1 and the virtual cell 2 to be any one of a unique code of the virtual cell 1 and a unique code of the virtual cell 2.

5. The electronic shelf label of claim 1, wherein the controller is configured to:
    based on determination that the virtual cell adjustment input is a touch input connecting a virtual cell 1, which is any one of the plurality of virtual cells to any one of boundary lines between the plurality of virtual cells, move the virtual cell 1 to a position corresponding to a boundary line at which the touch input ends.

6. The electronic shelf label of claim 1, wherein the controller is configured to: based on determination that the virtual cell adjustment input is a touch input connecting any area of a first side of a virtual cell 1, which is any one of the plurality of virtual cells, to any area of a second side of the virtual cell 1, divide the virtual cell 1 with respect to a boundary at an area where the virtual cell adjustment input is received.

7. The electronic shelf label of claim 6, wherein the controller is configured to:
    set the unique code of any one of the virtual cells generated by dividing the virtual cell 1 to be identical to a unique code of the virtual cell 1 and
    set a unique code of the other virtual cell to not be identical to each of the unique codes of other virtual cells.

8. The electronic shelf label of claim 1, wherein the controller is configured to: based on determination that the virtual cell adjustment input is a touch input connecting a boundary line between a virtual cell 1, which is any one of the plurality of virtual cells and a virtual cell 2, which is any one of virtual cells neighboring to the virtual cell 1 to any area of the virtual cell 1 or the virtual cell 2, move the boundary line to an area where the virtual cell adjustment input is received.

9. The electronic shelf label of claim 1, wherein the controller is configured to: based on determination that the virtual cell adjustment input is a touch input connecting any area of a virtual cell 1, which is any one of the plurality of virtual cells to any area of a first side of the virtual cell 1, merge the virtual cell 1 and a virtual cell 2, which is any one of virtual cells neighboring to the virtual cell 1.

10. The electronic shelf label of claim 9, wherein the controller is configured to set a unique code of the virtual cell generated by merging the virtual cell 1 and the virtual cell 2 to be a unique code of the virtual cell 2.

11. The electronic shelf label of claim 1, wherein the controller is configured to:
    based on reception of a lock input from the user, control the display in a lock mode in which the plurality of virtual cells and the unique code are not adjusted even when the virtual cell selection input or the virtual cell adjustment input is received.

12. The electronic shelf label of claim 11, wherein the controller is configured to: based on reception of an unlock input from the user when the controller controls the display in the lock mode, control the display in a normal mode in which the plurality of virtual cells or the unique code are adjusted based on the virtual cell selection input or the virtual cell adjustment input.

* * * * *